United States Patent
Wigmore et al.

(10) Patent No.: US 10,754,732 B1
(45) Date of Patent: Aug. 25, 2020

(54) SYSTEMS AND METHODS FOR BACKING UP A MAINFRAME COMPUTING SYSTEM

(71) Applicant: EMC IP Holding Company LLC, Hopkinton, MA (US)

(72) Inventors: Ian Wigmore, Westborough, MA (US); Bruce Ferjulian, Hudson, MA (US); Stephen Smaldone, Woodstock, CT (US); Arieh Don, Newton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 102 days.

(21) Appl. No.: 15/281,528

(22) Filed: Sep. 30, 2016

(51) Int. Cl.
 *G06F 16/00* (2019.01)
 *G06F 11/14* (2006.01)
 *G06F 9/455* (2018.01)

(52) U.S. Cl.
 CPC ...... *G06F 11/1453* (2013.01); *G06F 9/45558* (2013.01)

(58) Field of Classification Search
 None
 See application file for complete search history.

(56) References Cited

U.S. PATENT DOCUMENTS

| | | | | |
|---|---|---|---|---|
| 5,640,541 | A * | 6/1997 | Bartram | G06F 13/4027 703/26 |
| 6,816,916 | B1 * | 11/2004 | Black | G06F 3/0613 710/33 |
| 2002/0156921 | A1 * | 10/2002 | Dutta | H04L 29/06 709/246 |
| 2005/0049849 | A1 * | 3/2005 | Re | G06F 3/0605 703/26 |
| 2012/0143715 | A1 * | 6/2012 | Eshghi | G06F 17/30159 705/26.3 |
| 2016/0259568 | A1 * | 9/2016 | Grimsrud | G06F 3/0613 |

* cited by examiner

Primary Examiner — Son T Hoang
(74) Attorney, Agent, or Firm — Workman Nydegger (57) ABSTRACT

A storage system may include an interface configured to connect with a mainframe computing system. The interface converts the protocol used by the mainframe computing system to another protocol. Once the data, which may be present in a backup data stream, from the mainframe computing system is converted, the storage system may direct or transmit the backup data stream for further processing such as deduplication and/or compression. The de-duplicated and/or compressed backup data stream is then stored to storage of the storage system.

16 Claims, 5 Drawing Sheets

SYSTEMS AND METHODS FOR BACKING UP A MAINFRAME COMPUTING SYSTEM

FIELD OF THE INVENTION

Embodiments of the invention relate to systems and methods for protecting data. More specifically, embodiments of the invention relate to systems and methods for backing up data and more particularly to systems and methods for backing up data received from a mainframe computing system.

BACKGROUND

A mainframe computing system is a type of computer or computing system that is often used to perform critical applications that require substantial processing power. For example, mainframe computing systems may be used to process large, bulk data sets (e.g., taxes, census data, monetary transactions, weather patterns).

Historically, the term mainframe derives from the large cabinets used to house the processing units and memory of early computers. Today, the term is often used to distinguish high end more powerful computing systems from other less powerful computing systems. mainframe computing systems provide significant processing power and support substantial throughput. As a result, there is a need for redundant engineering and high reliability in mainframe systems.

Mainframe computing systems are conventionally backed up using magnetic tape libraries. Tape libraries are quite slow. As a result, the manner in which mainframe computing systems are backed up is changing. For example, some mainframe computing systems are backed up to disk storage devices.

This process, however, has introduced various problems into the backup operations. With a change in the backup technology, there is a corresponding change in the communication protocols. In fact, in order to backup a mainframe computing system using disk storage devices, it is necessary to interconnect a large number of distinct hardware devices. This large number of hardware devices is expensive and difficult to manage.

Figure 1:
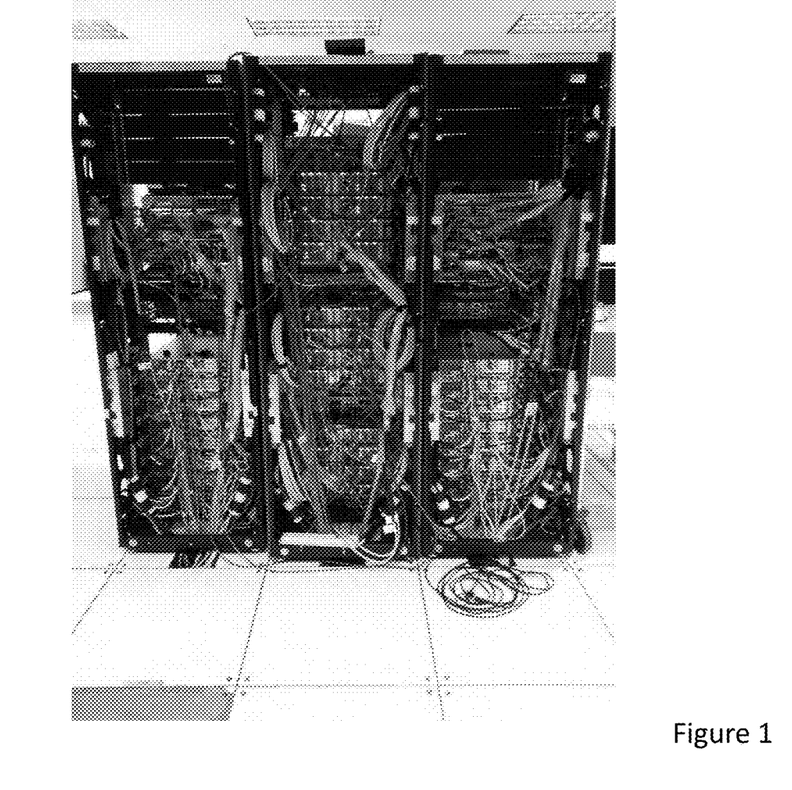
FIG. 1 illustrates an example of interconnected hardware devices required to backup a mainframe computing system.

FIG. 1, for example, illustrates the complexity of interconnected hardware devices needed to backup a mainframe computing system. In addition to the hardware expense and structural complexity shown in FIG. 1, conventional backup systems have a parallel management system that must interface with all of the devices involved in the backup operation. The complexity of the hardware arrangement and the complexity of the management system makes it difficult to maintain the backup systems and severely complicates troubleshooting problems that arise. Systems and methods for backing up mainframe computing systems are needed.

DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention relate to systems and methods for protecting data of a computing system such as a mainframe computing system. Embodiments of the invention relate to a storage system that is configured to interface with a mainframe computing system and backup and/or restore the data of the mainframe computing system. Embodiments of the invention relate to an integrated device or apparatus that is capable of backing up and or restoring one or more mainframe computing systems. The storage system discussed herein may be a single frame device or an integrated unit.

Embodiments of the invention relate to a storage system (e.g., a DLM (disk library for mainframe) device) that is configured to provide data protection operations for mainframe computing systems. In some embodiments, a mainframe computing system may be connected to a single integrated storage system that is configured to backup and/or restore the data of the mainframe computing system.

The storage system, in one example, presents itself to a mainframe computing system as a tape library (e.g., an emulated tape library) and provides an interface (e.g., a SLIC—Small Link Interface Card) capable of communicating with the mainframe computing system. The interface may provide network connectivity and be capable of understanding and communicating in the protocol used by the mainframe computing system. This allows the storage system to present itself as the device that the mainframe computing system understands. Embodiments of the invention discussed here may refer to specific protocols. However, embodiments of the invention may be adapted to other protocols used by mainframe computing systems or used in other computing systems. Further, embodiments of the invention may refer to specific protocol conversions, but embodiments are not limited thereto.

The interface of the storage system to the mainframe computing system may include hardware necessary to physically connect to a mainframe computing system=. The interface may include connections (software and/or hardware) to other components or modules of the storage system. In addition, the interface may be configured to be part of or included in a computing system such as a virtual machine or an emulated or embedded system. In one example, a guest system (e.g., virtual tape engine (VTE)) may include the interface. Stated differently, the hardware allocated to the VTE may include the interface. The interface may be configured to receive and understand data transmitted according to FICON (Fibre Connection) protocol. The VTE may convert the FICON protocol to FC (Fibre Channel) protocol. The VTE may convert the FICON protocol to SCSI (Small Computer Systems Interface) over FC. More specifically, a mainframe computing system may output data using FICON protocol or FICON TAPE protocol (Fibre Connection or Fibre Channel Protocol). The storage system, from the perspective of the mainframe computing system may look like a typical tape backup device. The VTE may be configured to transmit the converted data internally using, by way of example only, SCSI commands. The storage system may include embedded appliances (or be connected to physical machines) that can de-duplicate and compress backup data streams. The de-duplicated and backup data streams can then be stored in storage devices of the storage system.

Figure 2:
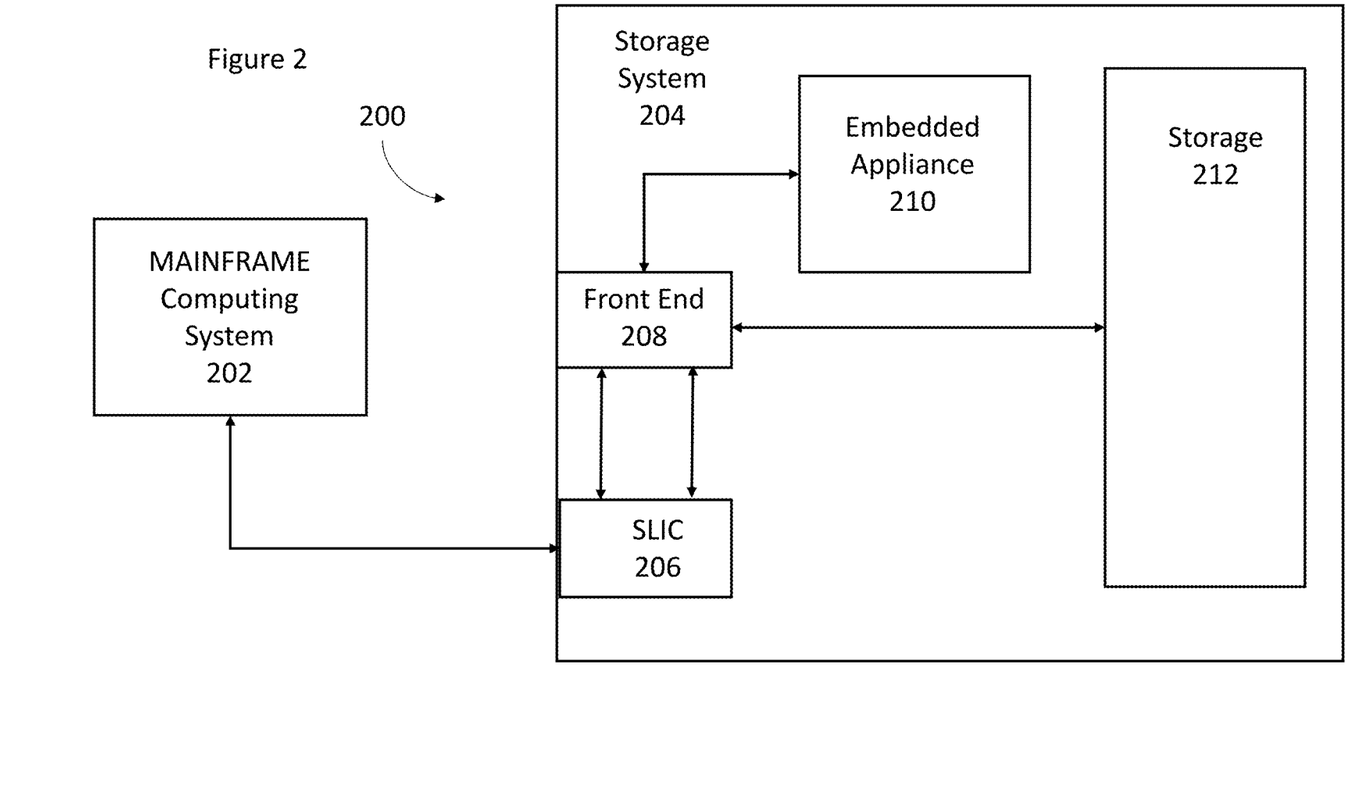
FIG. 2 illustrates an example of a storage system configured to provide data protection operations to a mainframe computing system.

FIG. 2 illustrates an example of a system 200 capable of providing data protection, including backup and restore operations, to a mainframe computing system. FIG. 2 illustrates a mainframe computing system 202 that is connected with a storage system 204 (e.g., a DLM device). The storage system 204 may be a single integrated device in a single frame.

The mainframe computing system 202 may only have a single point of connection with the storage system 204—a SLIC 206. However, the components of the storage system 204 are scalable such that multiple mainframe computing systems 202 can be connected to the storage system 204 or such that the storage system 204 may receive multiple streams from the mainframe computing system 202. Stated differently, the SLIC 206 may include multiple ports. The storage system 204 may also include ports configured to connect with other systems. A front end 208, for example, may provide ports or inputs to the storage system 204. The SLIC 206 may be configured for the mainframe computing system 204.

The storage system 204 includes a storage array 212 that may include multiple storage devices or storage device arrays for storing data. The storage system 204 is capable of backing up a mainframe computing system, such as an enterprise level computing system or a data center computing system. The storage system 204 may also be able to support live disk access for the mainframe computing system 202. Stated differently, the storage system 204 may function as a disk for the mainframe computing system 202 that can be read and written as necessary while performing operations.

The storage system 204 may include hardware and software that are configured to protect the data of the mainframe computing system 202. The storage system 204 includes a SLIC 206 that interfaces with the mainframe computing system 202 via an appropriate connection, such as a cable.

The SLIC 206 receives data from the mainframe computing system 202 according to FICON protocol (or other protocol). The SLIC 206 converts the data into another protocol, such as FC protocol. Data transfers inside the storage system 204 may be accomplished using SCSI (Small Computer System Interface) commands. The data received over the FICON protocol may be packetized by the SLIC 206 and transmitted via cables, buses, or by software.

Thus, the SLIC 206 is configured to connect with the mainframe computing system 202 and presents the equivalent of a tape backup appliance, in one example, to the mainframe computing system 202. Once connected with the mainframe computing system 202, the mainframe computing system 202 may send backup data to the SLIC 206. The SLIC 206 is configured to translate the electrical signals received from the mainframe computing system 202 in, by way of example, FICON protocol, and output an FC data stream such as a converted or backup data stream.

The SLIC 206 may output the converted data stream to a front end 208 of the storage system. The SLIC 206 may be programmable such that the SLIC 206 can be adapted to received data in different protocols and convert to other protocols as needed. Alternatively, the storage system 204 may be provided with multiple SLICs 206. In such a case, each SLIC may be the same or similarly configured. Alternatively, the various SLICs may accommodate different input protocols.

The front end 208 may include multiple ports, for example and may, in one example, also be used to connect with other systems that may present data in FC protocol. In another example, the front end 208 may function as a gateway that allows the data, including the converted data received from the SLIC 206, to be distributed or routed to various components inside the storage system 204. The front end 208 may direct the data stream from the SLIC 206 to an embedded appliance 210 or to the storage 212 for example.

The connection between the SLIC 206 and the front end 208 may be achieved using hardware (e.g., a cable) or software. When using a cable, the SLIC 206 converts the input data stream from FICON to FC and transmits the converted data (which may be packetized during the conversion process) to the front end 208. When using software, the SLIC 206 may convert the FICON data to packets that are stored in a memory. The front end 208 may retrieve the packets from the memory.

The storage system 204 may also include hypervisor technology. In one example, the embedded appliance 210 may be a virtual machine. The SLIC 206 may be part of another embedded or virtual machine. Embedded appliances or virtual machines can be configured to perform various functions. For example, a virtual machine that includes the SLIC 206 may be configured to convert FICON to FC and transmit an incoming data stream to the front end 208. The embedded appliance 210, for example, may be configured to de-duplicate and/or compress the data received from the mainframe computing system 202.

The data coming out of the mainframe computing system 202 is sent in FICON protocol as previously stated. The SLIC 206 outputs the data in FC protocol or using SCSI (Small Computer System Interface) over FC. The SLIC 206 can direct the converted data to the embedded appliance 210 through the front end 208. Thus, the front end 208 may include switches or the like that allow data streams to be routed to various ports of the front end 208. Once the data is de-duplicated and compressed by the embedded appliance 210, the data can then be directed back through the front end 208 to the storage 212 for storage.

Figure 3:
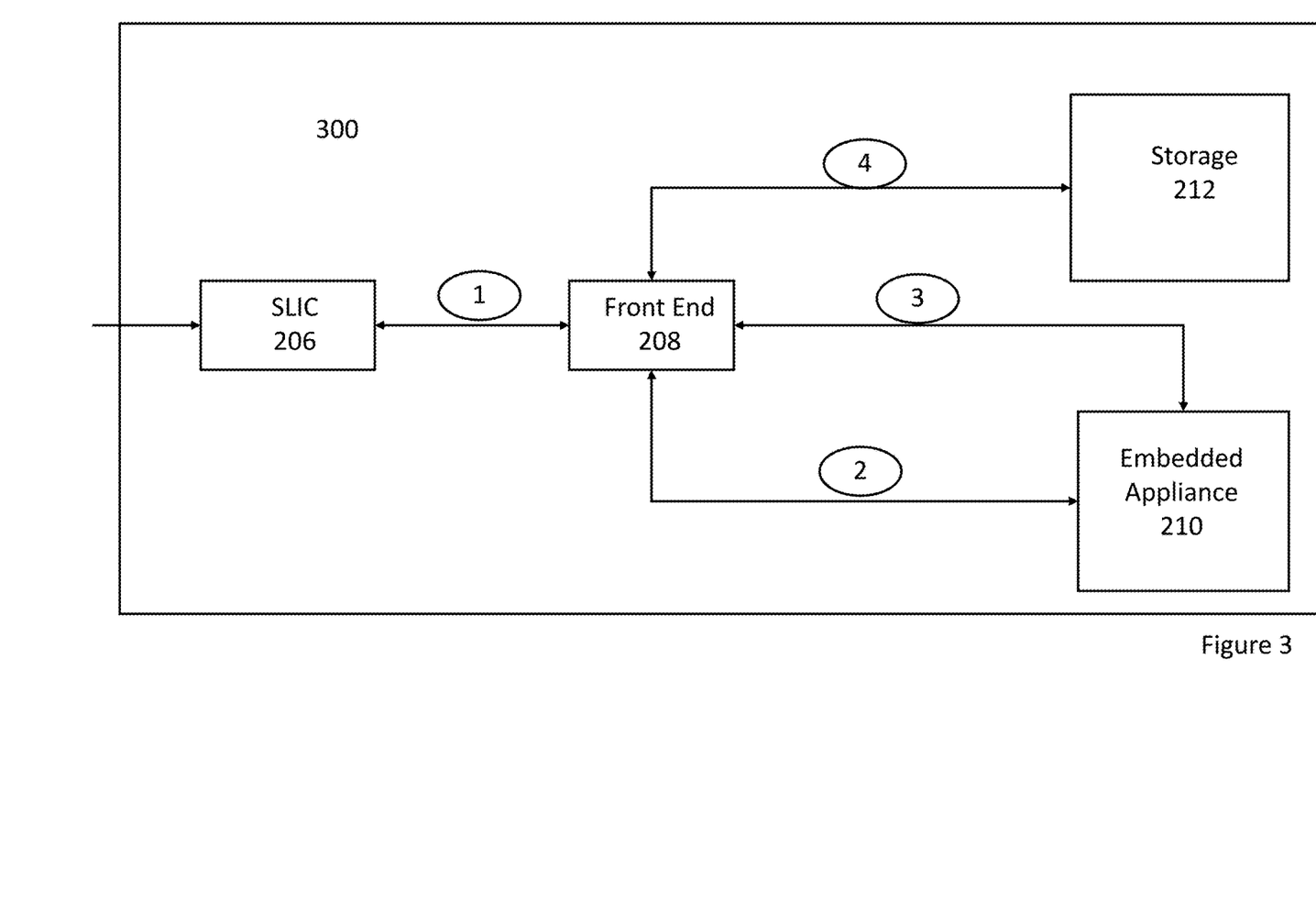
FIG. 3 is an example of a system backing up data of a mainframe computing system and illustrates a method for backing up the data of the mainframe computing system.

FIG. 3 illustrates an example a storage system 300 and illustrates a method for backing up data received from a mainframe computing system in a storage system 300 or other DLM device. The storage system 300 may be an example of the storage system 204 or a portion of the storage system 204. FIG. 3 illustrates an example of a director 300 that may be incorporated in the storage system 300. In one example, the storage system 300 or 204 may be configured to include multiple backup engines and each engine may include at least one director. This allows the storage system 300 to be scalable and to accommodate multiple inputs, for example from multiple mainframe computing systems. Alternatively, multiple inputs in the storage system 300 may be used to accommodate a single mainframe computing system.

In one example, the SLIC 206, front end 208, storage 212, and embedded appliance 210 are examples of components or modules of the storage system 300. The components or modules included in the director 300 may be configured to act as initiators and/or targets. For path 1, the SLIC 206 behaves as an initiator (e.g., a SCSI initiator) and the front end 208 becomes a target (e.g., a SCSI target). For the path 2, the front end 208 is an initiator and the embedded appliance 210 is a target. The roles are reversed for the path 3, where the embedded appliance 210 is an initiator and the front end 208 is a target. For the path 4, the front end 208 is an initiator and the storage 212 is a target.

The paths 1, 2, 3 and 4 illustrate a data flow inside the storage system 204 and illustrate a method for backing up data from a mainframe computing system after receiving data from the mainframe computing system at the SLIC 206. Paths 1, 2, 3, and 4 may be hardware and/or software paths. As necessary, the data streams can be buffered or otherwise processed while being transferred or while being used. A software path, by way of example, may cause the data to be stored in a memory. The data is then accessed as necessary from the memory by the next module in the flow path.

FIG. 3 illustrates that data from a mainframe computing system (e.g., 202 in FIG. 2) is received at a SLIC 206. The SLIC 206 converts the data from, by way of example only, from FICON to FC. The SLIC 206 outputs a backup stream that proceeds to the front end 208 using path 1, which may be a software or a hardware path. The front end 208 may include multiple ports and is capable of directing the data or backup data stream to other components or modules such as the storage or the embedded appliance. Thus, the front end 208 receives the backup data stream from the SLIC 206 and redirects the backup data stream as necessary.

In one embodiment, the front end 208 may send the backup data stream to the embedded appliance 210 using path 2, which may be hardware and/or software. The embedded appliance 210 is configured to de-duplicate and/or compress the backup data stream. In FIG. 3, the embedded appliance 210 may be a virtual machine running on a hypervisor layer.

Once the data is de-duplicated and/or compressed by the embedded appliance 210, the data is transmitted for storage in the storage 212. In one example, the de-duplicated and/or compressed data is transmitted to the front end 208 by path 3 and the front end 208 transmits the data to the storage 212 where the data of the mainframe computing system is stored as a save set using the path 4. Alternatively, the embedded appliance 210 may transmit the de-duplicated backup data stream directly to the storage 212.

In an alternative embodiment, the embedded appliance 210 may be an external device that has its own storage. Thus, the front end 208 may transmit the data to the external appliance and the external appliance, after de-duplicating and/or compressing the data, may store the data in its own storage. The external device, however, could also send the de-duplicated and/or compressed backup stream back to the storage system for storage.

When the appliance 210 is an embedded appliance, the data may be transmitted to the storage 212 via paths 3 and 4 through the front end 208 because the embedded appliance is software and is a virtual machine and may not have its own dedicated storage. In another example, the embedded appliance 210 may be able to direct the de-duplicated backup stream or data directly to the storage 212.

Figure 4:
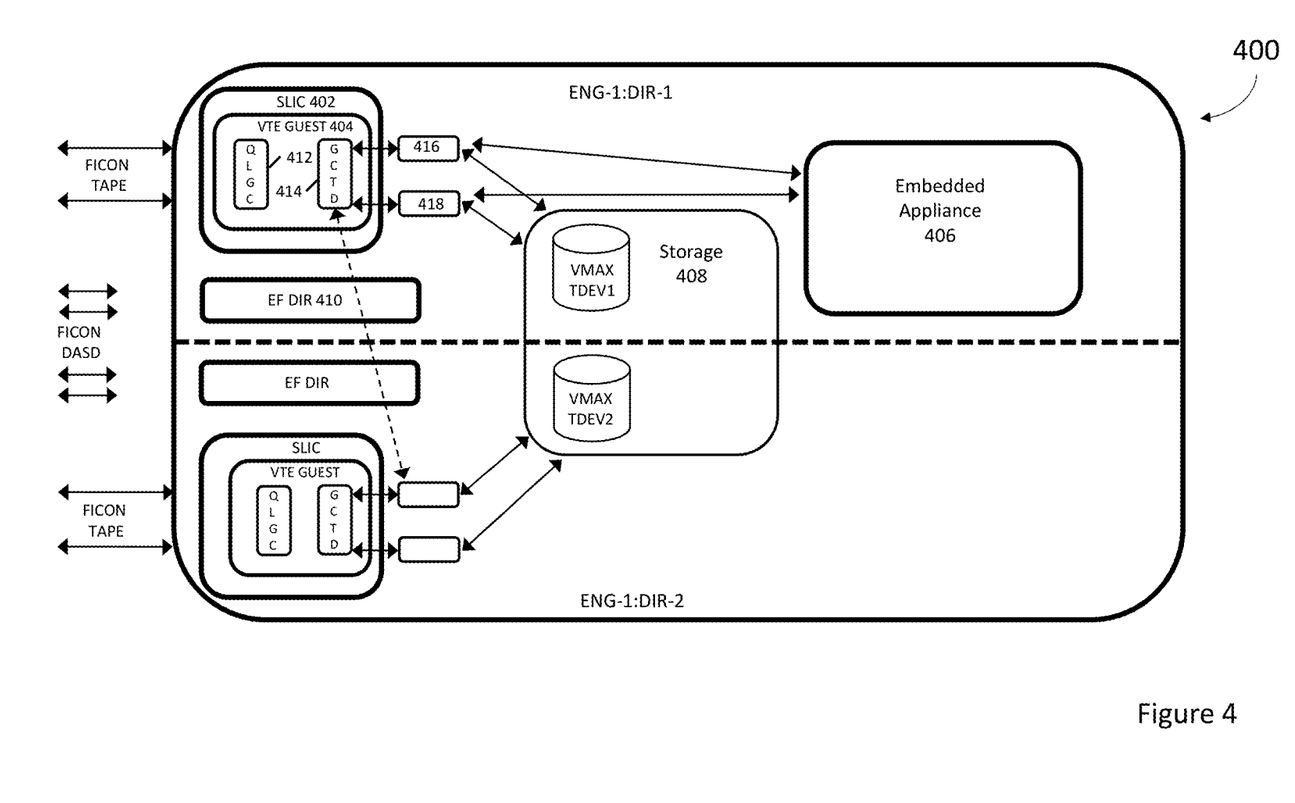
FIG. 4 illustrates a more detailed example of a storage systems configured to backup of and/or restore data of a mainframe computing system.

FIG. 4 illustrates a more detailed view of an engine of a storage system 400. FIG. 4 illustrates the scalability of the storage system 400, which is an example of the storage system 204. FIG. 4 illustrates an engine for backing up the data of a mainframe computing system or other source data. The engine includes two directors in this example. The storage system 400 may include multiple engines.

In the storage system 400, each director is associated with a SLIC. Engine 1, director 1, for example, is associated with a SLIC 402, which is an example of the SLIC 206. The SLIC 402 allows the storage system 400 to appear as a tape library to a mainframe computing system and receives FICON TAPE protocol from the mainframe computing system. The storage system 400 may also receive FICON DASD (FICON Direct-Access Storage Device). This allows the storage device 400 to act as a direct access storage device for the mainframe computing system. The engine 1, director 2 is similarly configured.

The SLIC 402 may reside in or be associated with a virtual tape engine (VTE) 404 implemented as a guest virtual machine. The VTE 404 may include a protocol chip such as an FC protocol chip 412. The VTE 404 may also include a driver 414. The FC protocol chip 412 may include a chip that converts FICON to FC protocol. The signals received over the FICON connection are converted, in one example, into packets that can be transmitted using, for example FC protocol or using SCSI over FC. These transmissions are internal to the storage system 400.

The driver 414 is capable of receiving the packets from the FC protocol chip 412, which were converted to FC from FICON. The driver 414 may send the packets (or other suitable form) over an internal port (e.g., the ports 416 and 418) within the storage system 400. The driver 414 may be software or is part of the VTE guest 404. The VTE guest 404 both converts data received from the mainframe computing system and transmits or directs the converted data within the storage system 400. The driver 414 allows any VTE guest 404 on any engine/director to access any device included in the storage 408 (e.g., the device TDEV1 or TDEV2 by way of example).

For example, the FICON data is received and output as packets by the FC protocol chip 412. The FC protocol chip 412 may include or be associated with other hardware that is controlled by the VTE guest 404. Once the packets are obtained, the VTE guest 404 can transmit the packets using SCSI over FC. In this example, the VTE guest 404 sends the packets or the backup data stream to the embedded appliance 406 over a port 416. After the embedded appliance de-duplicates and/or compresses the backup data stream, the de-duplicated and/or compressed backup data stream is returned to one of the ports 416, 418. The ports 416, 418 may be examples of the front end 208. The de-duplicated and/or compressed backup data stream is then sent to the storage 408 using the ports 416 and/or 418 for storage.

Figure 5:
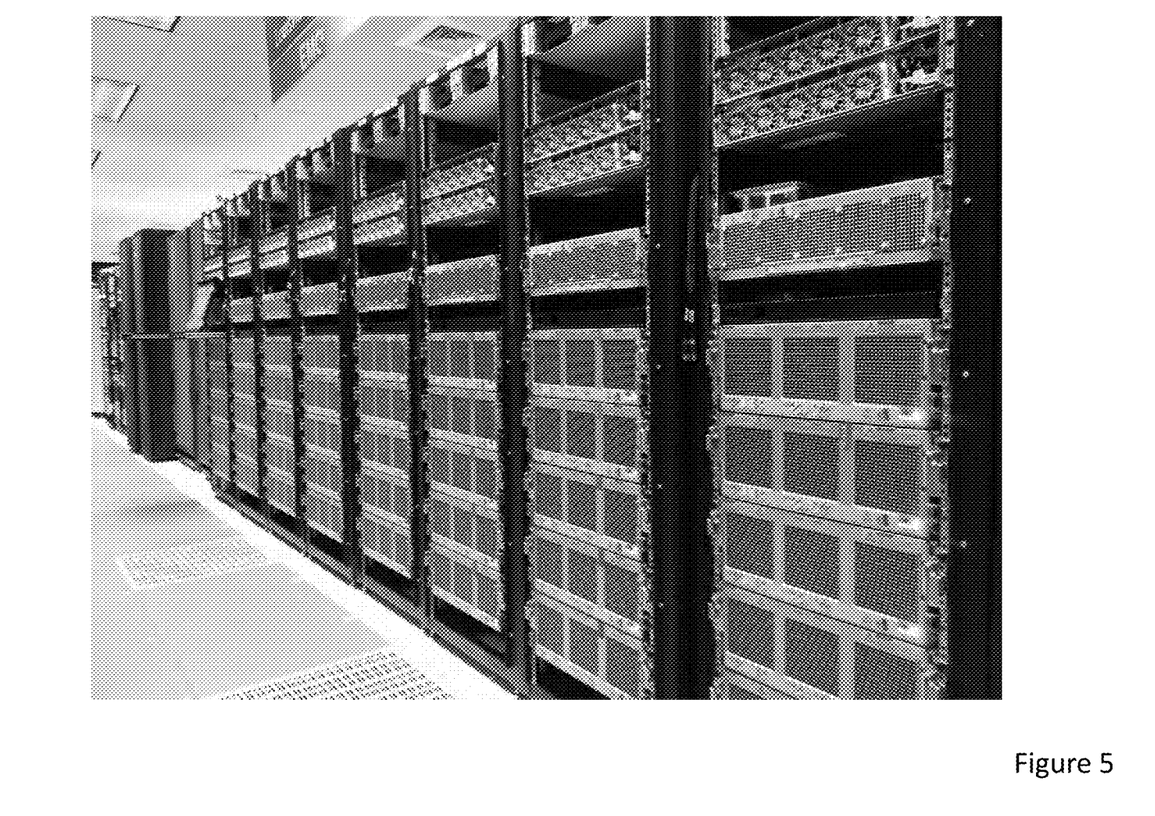
FIG. 5 illustrates an example a storage system for backing up and/or restoring data of a mainframe computing system.

FIG. 5 illustrates an example of a storage system capable of protecting (e.g., backing up and/or restoring) data of a mainframe computing system. The storage system shown in FIG. 5 eliminates the complexity of conventional arrangements and facilitates management and troubleshooting as illustrated in FIG. 1.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein. Embodiments of the invention further include instructions enabling the hardware or software modules or components to be virtualized.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, DRAM, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. Depending on context, a module or component may also include hardware and/or software and/or firmware. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein. A controller may include a processor and memory and/or other computing chips.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An integrated storage system for protecting data of a mainframe computing system, the integrated storage system comprising:
   a small link interface card configured to receive the data directly from the mainframe computing system over a cable according to a first protocol used by the mainframe computing system and output a backup data stream using a second protocol, wherein
      the small link interface card is configured to allow the mainframe computing system to communicate with the small link interface card in the first protocol of the mainframe computing system and to communicate internally within the integrated storage system in the second protocol,
      the small link interface card is allocated to a virtual machine and is associated with a protocol chip configured to perform protocol conversions, and
      the virtual machine comprises a driver configured to transmit the backup data stream that has been converted to the second protocol;
   a front end comprising a plurality of ports and configured to receive the backup data stream outputted by the small link interface card, the plurality of ports including at least a first port connecting the small link interface to the front end and other ports configured to directly connect the integrated storage system to other devices; and
   a storage device, wherein the backup data stream is directed to the storage device from the front end, the plurality of ports including a second port connecting the storage device to the front end, wherein the small link interface card is only connected to the front end in the integrated storage system and is only connected to the storage device through the plurality of ports included in the front end storage system;
   an embedded device configured to:
      receive the converted backup data stream from the front end using the plurality of ports, and de-duplicate or compress the converted backup data stream;
      transmit the de-duplicated or compressed backup data stream from the embedded device to the front end using the plurality of ports; and
      store the de-duplicated or compressed backup data stream in a storage of the integrated storage system by transmitting the de-duplicated or compressed backup data stream to the storage through the plurality of ports, wherein the virtual machine directs routing of the backup data stream within the integrated storage system.

2. The storage system of claim 1, wherein the virtual machine comprises a virtual tape engine operating as a guest.

3. The storage system of claim 2, the small link interface card causes the integrated storage system to appear as a tape library to the mainframe computing system.

4. The storage system of claim 2, wherein the virtual tape engine includes logic configured to receive data from the mainframe computing system and output packets.

5. The storage system of claim 4, wherein the virtual tape engine further comprises a driver configured to allow the virtual tape engine to transmit the backup data stream according to the second protocol internally within the storage system.

6. The storage device of claim 5, wherein the virtual tape engine is configured to direct to any storage device mapped from a pool of storage devices.

7. The storage system of claim 1, wherein the small link interface card communicates with the front end using the cable or software.

8. The storage system of claim 1, wherein the first protocol comprises FICON (Fibre Connection) and the second protocol comprises FC (Fibre Channel) or SCSI (Small Computer Systems Interface) over FC.

9. A small link interface card for protecting data of a mainframe computing system and integrated into an integrated storage system, the small link interface card comprising:
- an interface configured to receive data from the mainframe computing system directly over a cable according to a first protocol of the mainframe computing system;
- logic configured to physically receive the data according to the first protocol and output a backup data stream in a second protocol, wherein:
  - the small link interface card is configured to allow the mainframe computing system to communicate in the first protocol of the mainframe computing system and is configured to communicate internally with the integrated storage system in the second protocol;
  - the small link interface card is only connected to the internal port in the integrated storage system and is only connected to a storage device of the integrated storage system through the internal port;
  - the small link interface card is allocated to a virtual machine and is associated with a protocol chip configured to perform protocol conversions; and wherein
  - the virtual machine comprises a driver configured to transmit the backup data stream according to the second protocol via the internal port to the storage device; and
- logic configured to:
  - transmit the backup data stream in the second protocol to an embedded device from a front end of the integrated storage system, wherein:
    - the front end comprising a plurality of ports, the plurality of ports including at least the internal port and other ports configured to directly connect the integrated storage system to other devices, and
    - the backup data stream is de-duplicated or compressed the by the embedded device;
  - transmit the de-duplicated or compressed backup data stream from the embedded device to the front end using the plurality of ports; and
  - store the de-duplicated or compressed backup data stream in the storage device by transmitting the de-duplicated or compressed backup data stream to the storage device through the plurality of ports, wherein the virtual machine directs routing of the backup data stream within the integrated storage system.

10. The small link interface card of claim 9, wherein the virtual machine comprises a virtual tape engine operating as a guest on a hypervisor, wherein the virtual tape engine includes the logic and the driver.

11. The small link interface card of claim 10, wherein the interface appears as a tape library to the mainframe computing system.

12. The small link interface card of claim 9, wherein the first protocol comprises FICON (Fibre Connection) and the second protocol comprises FC (Fibre Channel) or SCSI (Small Computer Systems Interface) over FC.

13. A method for backing up data received from a mainframe computing system in an integrated storage system, the method comprising:
- receiving a backup data stream from the mainframe computing system over a cable at a small link interface card of the integrated storage system, wherein the small link interface card is configured to physically connect to the mainframe computing system and is configured to communicate in a first protocol with the mainframe computing system, and to communicate internally in a second protocol within the integrated storage system, wherein the small link interface card is allocated to a virtual machine and is associated with a protocol chip configured to perform protocol conversions, and is associated with a driver configured to transmit packets that have been converted to the second protocol;
- converting the backup data stream from the first protocol to the second protocol and transmitting the converted backup data stream to a front end of the integrated storage system, wherein the front end includes a plurality of ports, and the small link interface card is only connected to the front end;
- transmitting the converted backup data stream from the front end using the plurality of ports to an embedded appliance that is configured to de-duplicate or compress the converted backup data stream;
- transmitting the de-duplicated or compressed backup data stream from the embedded appliance to the front end using the plurality of ports; and
- storing the de-duplicated or compressed backup data stream in a storage of the integrated storage system by transmitting the de-duplicated or compressed backup data stream to the storage through the plurality of ports, wherein the virtual machine directs routing of the backup data stream within the integrated storage system.

14. The method of claim 13, wherein the first protocol comprises FICON (Fibre Connection) and the second protocol comprises FC (Fibre Channel) or SCSI (Small Computer Systems Interface) over FC.

15. The method of claim 13, wherein the virtual machine includes a virtual tape engine operating as a guest.

16. The method of claim 15, further comprising presenting a tape library to the mainframe computing system via the virtual tape engine, wherein the virtual tape engine includes logic to convert the first protocol to the second protocol and includes the driver to route the backup data stream within the integrated storage system.

* * * * *